United States Patent [19]

Hill

[11] 4,138,792
[45] Feb. 13, 1979

[54] ARTIFICIAL SNAKE-EEL BODY

[75] Inventor: Loren G. Hill, Norman, Okla.

[73] Assignee: Norman Manufacturing Co., Inc., Greenwood, Ark.

[21] Appl. No.: 843,071

[22] Filed: Oct. 17, 1977

[51] Int. Cl.$^2$ .......................... A01K 85/00; A63H 3/00
[52] U.S. Cl. ..................................... 43/42.24; 46/152
[58] Field of Search ............................ 43/42.24, 42.31; 46/152

[56] References Cited

U.S. PATENT DOCUMENTS

| | | | |
|---|---|---|---|
| 596,385 | 12/1897 | Simon | 43/42.24 X |
| 3,054,209 | 9/1962 | Wiley, Jr. | 43/42.24 X |
| 3,245,171 | 4/1966 | Henry | 43/42.24 |
| 3,979,853 | 9/1976 | Storm et al. | 43/42.31 X |

Primary Examiner—Al Lawrence Smith
Assistant Examiner—James G. Smith
Attorney, Agent, or Firm—Clarence A. O'Brien; Harvey B. Jacobson

[57] ABSTRACT

An elongated strip-type body member of spiral configuration decreasing in radius of curvature toward one end thereof is provided. The strip member is of greater width than thickness and includes a generally outwardly projecting terminal end on its greater radius of curvature end extending generally axially of the spiral of the strip member. The body is constructed of resilient shape retentive, but flexible material. One longitudinal edge of the strip member comprises the inner periphery of the spiral and the other longitudinal edge of the strip member comprises the outer periphery of the spiral. The aforementioned one inner longitudinal edge of the strip is of greater thickness than the other outer longitudinal edge and the strip member tapers in thickness from the greater thickness longitudinal edge toward the lesser thickness longitudinal edge.

4 Claims, 4 Drawing Figures

ARTIFICIAL SNAKE-EEL BODY

BACKGROUND OF THE INVENTION

Various forms of artificial snake and eel bodies have been provided for use as fishing lures. When a lure of this type is provided it is desirable that the lure move through the water in an undulating manner so as to simulate the swimming movement of a snake or eel. Some forms of eel simulating lures are constructed of surgical tubing and have piano wire extending therethrough whereby the lure may be semi-permanently bent into a shape which will tend to move through the water in an undulating manner. However, the cylindrical configuration of surgical tubing, even when a bent piano wire core is utilized in conjunction therewith, it is not conducive to moving through the water in a true undulating fashion to simulate the swimming movement of an eel, but rather moves through the water in a spinning motion which only appears similar to an undulating movement. Accordingly, a need exists for a snake or eel simulating artificial lure that may more closely simulate the undulating swimming movement of a snake or eel as the lure moves through the water.

BRIEF DESCRIPTION OF THE INVENTION

The lure of the instant invention comprises an elongated strip member of spiral configuration which decreases in radius of curvature toward the rear end thereof. The strip is of greater width than thickness and one longitudinal edge of the strip comprises the innter periphery of the spiral and the other longitudinal edge of the strip comprises the outer periphery of the spiral. Further, the strip tapers in width from the outer periphery defining longitudinal edge thereof toward the inner periphery defining longitudinal edge thereof. The strip is constructed of resilient, shape retentive but flexible material and includes, on its large radius of curvature end an endwise outwardly projecting terminal end portion extending generally axially of the spiral of the strip and intended to simulate the head of a swimming snake or eel. The strip, when moved forwardly through the water, undulates in the manner of a swimming snake or eel and the swimming "action" thereof is difficult to distinguish from the undulating swimming movement of a snake or eel.

The main object of this invention is to provide an artificial snake-eel lure for fishing purposes.

Another object of this invention, in accordance with the immediately preceding object, is to provide a lure which will substantially duplicate the swimming movements of a snake or eel.

Yet another object of this invention is to provide a lure which may be readily molded and which may therefore be manufactured at a low cost.

A still further object of this invention is to provide a lure which may be utilized in conjunction with conventional barbed hooks in order that the size of the hooks provided on the lure may be readily changed whenever desired.

A final object of this invention to be specifically enumerated herein is to provide a lure in accordance with the preceding objects and which will conform to conventional forms of manufacture and be of simple construction, so as to provide a device that will be economically feasible and readily manufacturable at a low cost.

These together with other objects and advantages which will become subsequently apparent reside in the details of construction and operation as more fully hereinafter described and claimed, reference being had to the accompanying drawings forming a part hereof, wherein like numerals refer to like pars throughout.

DETAILED DESCRIPTION OF THE INVENTION

Figure 1:
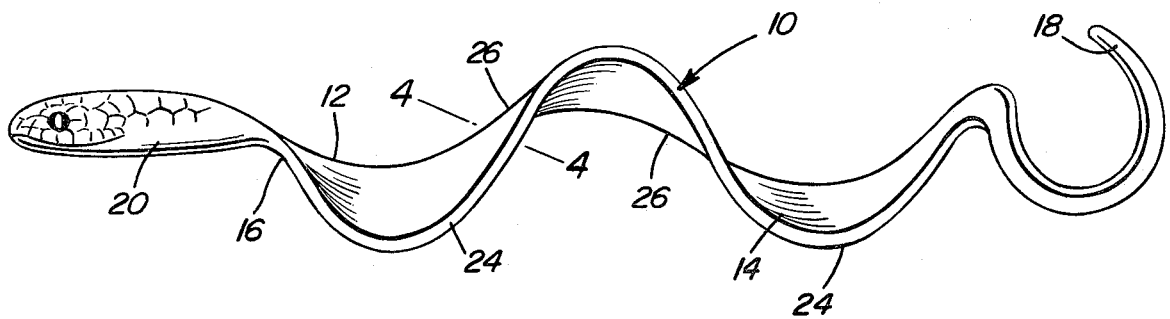
FIG. 1 is a perspective view of the artificial lure of the instant invention as seen from the right side thereof.
Figure 2:
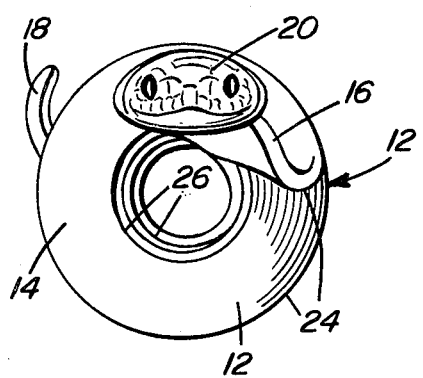
FIG. 2 is a front elevational view of the lure.
Figure 3:
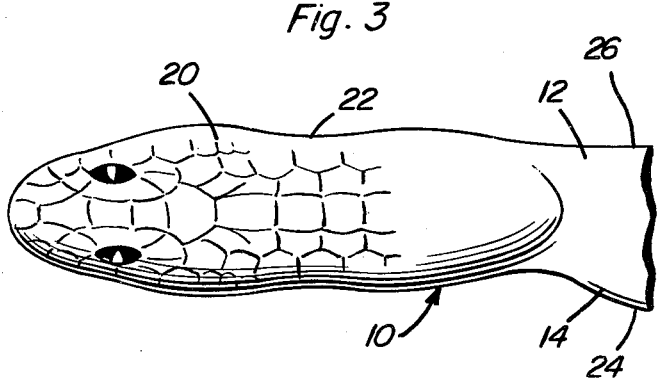
FIG. 3 is a top plan view of the forward head defining portion of the lure.
Figure 4:
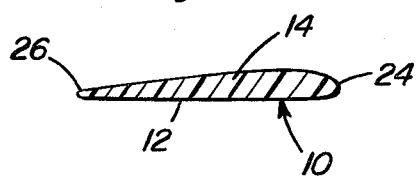
FIG. 4 is an enlarged, fragmentary, transverse vertical, sectional view taken substantially upon the plane indicated by the section line 4—4 of FIG. 1.

Referring now more specifically to the drawings, the numeral 10 generally designates the lure of the instant invention. The lure 10 includes an elongated body 12 comprising an elongated strip member 14 of spiral configuration decreasing in radius of curvature from the front end 16 thereof to the rear end 18 thereof. The strip is of greater width than thickness and includes a generally endwise outwardly projecting terminal end portion 20 on its greater radius of curvature end. The terminal end portion 20 extends substantially axially of the spiral of the strip member 14 and is shaped to simulate the head of a snake or eel. Further, the terminal end porton 20 includes a longitudinal central portion 22 of reduced cross-sectional dimensions.

The strip member 14 includes a first longitudinal edge portion 24 defining the outer periphery of the spiral of the strip member 14 and a second longitudinal edge portion 26 defining the inner peripheral portion of the spiral of the strip member 14. The strip member 14 tapers in thickness from the longitudinal edge 24 thereof toward the longitudinal edge 26 and the body 12 is constructed of a resilient, strip retentive but flexible material through which the barbed end of a hook may be readily passed. The material of which the body 12 is constructed resists tearing. Accordingly, a barbed hook member may be passed through the terminal end portion 20. Further, in addition to a barbed hook carried by the terminal end portion 20, a second barbed hook may be passed through an intermediate longitudinal portion of the strip member 14 and tethered to the hook passed through the terminal end portion 20. The material of which the body 12 is constructed enables such hook members to be readily removed and replaced by hook members of different size whenever desired.

When the lure 10 is pulled forwardly through the water, the terminal end 20 thereof remains reasonably steady while the portion of the strip member 14 disposed rearwardly of the terminal member 20 undulates in the manner of a naturally swimming eel or snake. Accordingly, the lure 10 has an "action" superior to that which may be achieved by surgical tubing eel lures reinforced by a central core of piano wire or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An elongated artificial snake-eel body, for use as a fishing lure, said body comprising an elongated strip member of multi-convolution spiral configuration decreasing in radius of curvature from one end thereon toward the other end, said strip including opposite side longitudinal edges and being of greater transverse width than thickness and including a generally endwise outwardly projecting terminal end on said one end thereof, said body being constructed of resilient, shape retentive but flexible material, one longitudinal edge of said strip member comprising the inner periphery of said spiral and the other longitudinal edge of said strip member comprising the outer periphery of said spiral, said strip member tapering in thickness from said other edge thereof toward said one edge thereof.

2. The combination of claim 1 wherein said terminal end is of greater thickness and less width than said strip.

3. The combination of claim 2 wherein said terminal end includes a longitudinal midportion of reduced transverse cross-sectional area.

4. The combination of claim 1 wherein said strip also tapers in transverse width from said terminal end toward said other end thereof.

* * * * *